United States Patent
Cunnane

(10) Patent No.: US 8,890,353 B2
(45) Date of Patent: Nov. 18, 2014

(54) POWER GENERATING HYDROCONVEYOR

(71) Applicant: Frank Patrick Cunnane, Chardon, OH (US)

(72) Inventor: Frank Patrick Cunnane, Chardon, OH (US)

(73) Assignee: Frank Patrick Cunnane, Chardon, OH (US)

( * ) Notice: Subject to any disclaimer, the term of this patent is extended or adjusted under 35 U.S.C. 154(b) by 0 days.

(21) Appl. No.: 13/897,500

(22) Filed: May 20, 2013

(65) Prior Publication Data

US 2013/0313830 A1   Nov. 28, 2013

Related U.S. Application Data

(60) Provisional application No. 61/650,121, filed on May 22, 2012.

(51) Int. Cl.
*F03B 13/00* (2006.01)

(52) U.S. Cl.
USPC ................................................. 290/54; 415/5

(58) Field of Classification Search
USPC .......................................... 290/43, 54; 415/5
See application file for complete search history.

(56) References Cited

U.S. PATENT DOCUMENTS

| | | | |
|---|---|---|---|
| 1,296,623 A | 3/1919 | Charles | |
| 3,807,890 A | 4/1974 | Wright | |
| 3,927,330 A * | 12/1975 | Skorupinski | 290/54 |
| 4,211,076 A | 7/1980 | Grande | |
| 4,805,761 A | 2/1989 | Totsch | |
| 5,641,054 A | 6/1997 | Mori et al. | |
| 6,809,430 B2 * | 10/2004 | Diederich | 290/54 |
| 7,213,398 B2 * | 5/2007 | Takeuchi | 60/495 |
| 7,478,974 B1 | 1/2009 | Kelly | |
| 7,785,065 B2 * | 8/2010 | Clemens | 415/5 |
| 7,862,290 B2 * | 1/2011 | Diederich | 415/5 |
| 7,969,034 B2 | 6/2011 | Winius | |
| 8,083,483 B1 | 12/2011 | Thorsbakken | |
| 8,344,540 B2 * | 1/2013 | Kim et al. | 290/55 |
| 8,400,002 B2 * | 3/2013 | Gagnon | 290/43 |
| 8,531,049 B2 * | 9/2013 | Rosendall | 290/1 R |
| 2008/0277940 A1 | 11/2008 | Krouse | |
| 2008/0303284 A1 * | 12/2008 | Clemens | 290/54 |

* cited by examiner

*Primary Examiner* — Nicholas Ponomarenko
(74) *Attorney, Agent, or Firm* — Mark E. Bandy; Rankin, Hill & Clark LLP

(57) ABSTRACT

Hydroconveyors are described which utilize magnetic levitation or magnetic suspension to support a collection of conveyor elements. The hydroconveyors are located above or partially within a flowstream such as a river. Additional versions of the hydroconveyors are described which include velocity increasing waterways located upstream of an end of the hydroconveyor. The various hydroconveyors can be used in conjunction with electrical generators to provide electrical power.

9 Claims, 17 Drawing Sheets

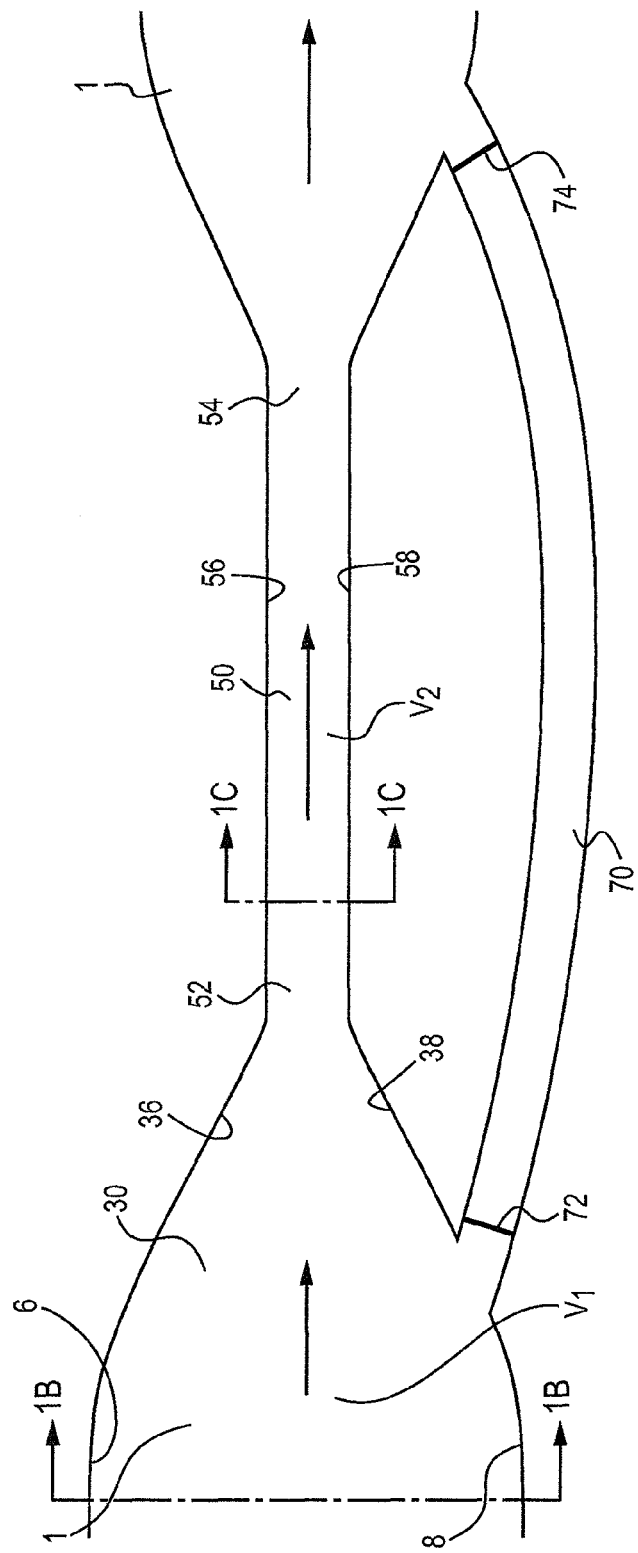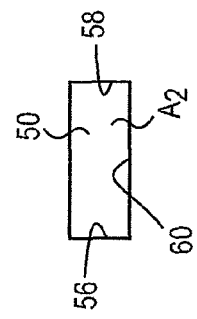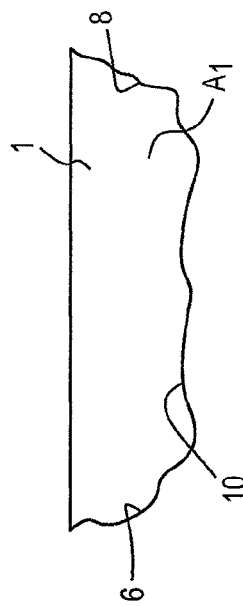

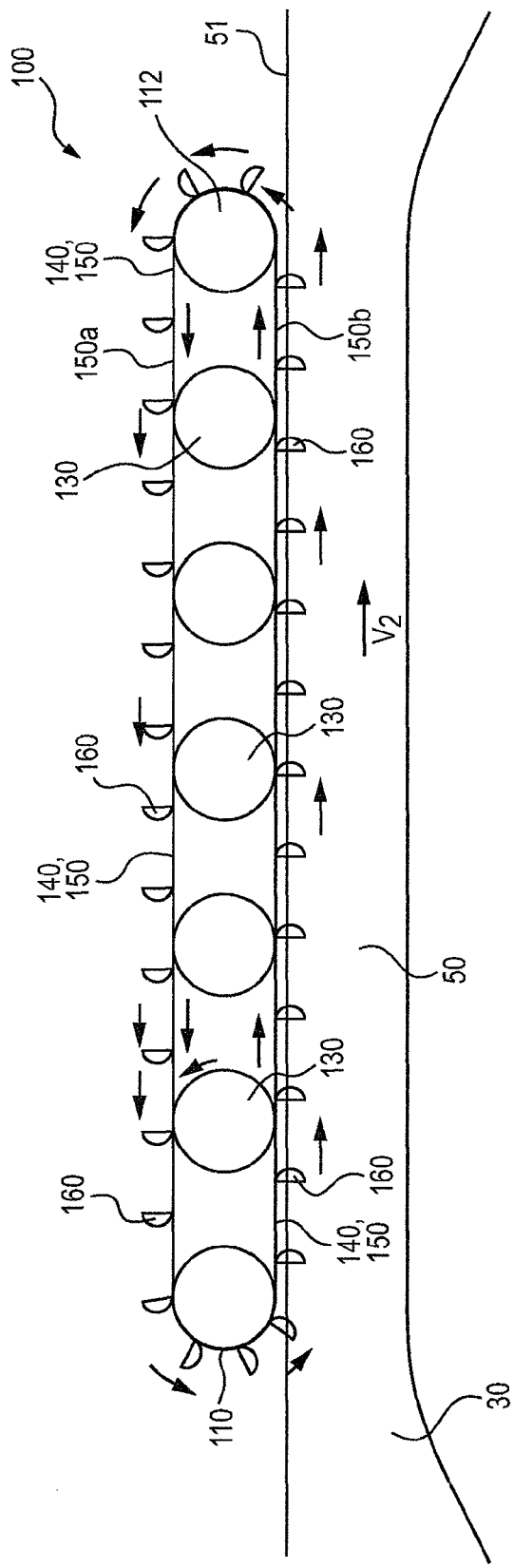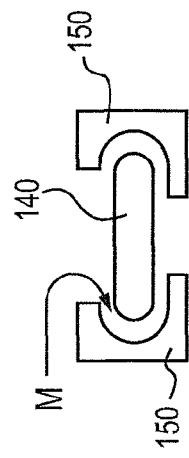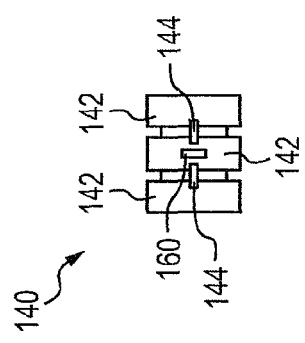
FIG. 4A
FIG. 4C
FIG. 4B

US 8,890,353 B2

POWER GENERATING HYDROCONVEYOR

CROSS REFERENCES TO RELATED APPLICATIONS

This application claims priority upon U.S. provisional application Ser. No. 61/650,121 filed on May 22, 2012.

FIELD

The present subject matter relates to systems for generating power from flowing water.

BACKGROUND

A vast source of potential energy is presently not being captured from thousands of flowing streams, tidal currents, tidal streams and ocean and lake waves.

Many suggestions have been made through the years as to various methods for capturing energy from flowing waters, including complicated, complex networks of coffer dams, concentrating valves, storage basins and underwater hydroplanes. In the majority of these propositions, costs are prohibitively high.

However, as far as is known, no previous strategy has provided a means for efficiently powering an electrical generator by use of a system capable of extracting the energy from flowing water. Furthermore, with regard to previous attempts at such energy extraction, such systems have not yet been developed to such a level that the systems satisfactorily meet the demand for relatively large amounts of electrical power from modern society.

SUMMARY

The difficulties and drawbacks associated with previously known systems are addressed in the present system for a hydroconveyor system.

In one aspect, the present subject matter provides a hydroconveyor system adapted for placement in a flowstream. The hydroconveyor system comprises a longitudinal frame including a first distal end and a second distal end. The hydroconveyor system also comprises a track extending along at least a portion of the length of the frame between the first end and the second end of the frame. The track defines a continuous and closed loop. The hydroconveyor system also comprises a plurality of conveyor elements movably disposed and retained in the track. At least a portion of the plurality of conveyor elements include outwardly extending members for engaging the flowstream. The hydroconveyor also comprises means for magnetically supporting the plurality of conveyor elements with regard to the track.

In another aspect, the present subject matter provides a hydroconveyor system adapted for placement in a flowstream. The hydroconveyor system comprises a longitudinal frame including a first distal end and a second distal end. The hydroconveyor system also comprises a longitudinal track extending along at least a portion of the length of the frame between the first end and the second end of the frame. The track defines a continuous and closed loop. The hydroconveyor system also comprises a plurality of conveyor elements movably disposed and retained in the track. At least a portion of the plurality of conveyor elements include outwardly extending members for engaging the flowstream. The hydroconveyor system also comprises a velocity increasing structure disposed upstream from the frame and proximate one of the frame ends. The velocity increasing structure includes an entrance, an exit, and converging sidewalls extending between the entrance and the exit which result in a velocity increase of the flowstream.

In yet another aspect, the present subject matter provides a system for providing electrical power from a flowstream. The system comprises a hydroconveyor including (i) a frame having a first end and a second end, (ii) a track extending along at least a portion of the length of the frame and between the first and second ends, the track defining a continuous and closed loop, (iii) a plurality of conveyor elements movably disposed and retained in the track, wherein at least a portion of the conveyor elements include outwardly extending members, and (iv) at least one rotatable member in engagement with the plurality of conveyor elements such that as the conveyor elements move linearly along the track, the at least one rotatable member is rotated. The system also comprises at least one electrical generator having a rotary input in engagement with the at least one rotatable member of the hydroconveyor. Upon rotation of the rotary input, electrical power is provided at an output of the generator.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIG. 1A is a schematic plan view of a river, a transition region, and a narrowed waterway in accordance with the present subject matter.

FIG. 1B is a schematic cross sectional view of the river in FIG. 1A taken across line 1B-1B.

FIG. 1C is a schematic cross sectional view of the waterway depicted in FIG. 1A taken across line 1C-1C.

FIG. 4A is a schematic side elevational view of a hydroconveyor engaging a flowstream in accordance with the present subject matter.

FIG. 4B is a schematic top view of several conveyor elements that may be used in the hydroconveyor depicted in FIG. 4A.

FIG. 4C is a schematic front cross sectional view illustrating one version of an assembly for supporting a conveyor or a collection of conveyor elements within a track of the hydroconveyor depicted in FIG. 4A.

DETAILED DESCRIPTION OF THE EMBODIMENTS

Figure 2:
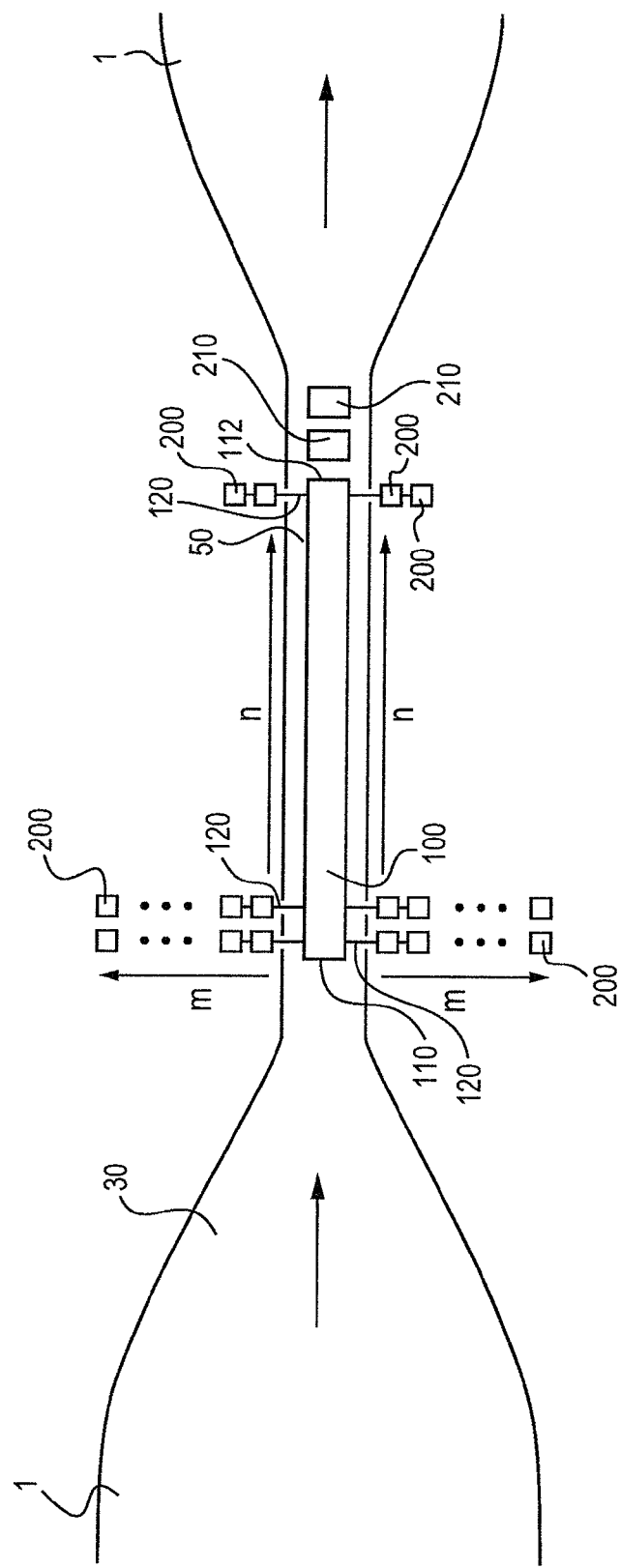
FIG. 2 is a schematic plan view of a hydroconveyor located in the narrowed waterway of FIG. 1.

The present subject matter provides various hydroconveyor systems which, when incorporated in a flowstream such as for example flowing water, provide powered rotary outputs which can be used to efficiently drive electrical generators or other components. In one version of the hydroconveyor systems, magnetic levitation is utilized to support a plurality of movable conveyor elements. In other versions of the hydroconveyor systems, a velocity increasing waterway is provided upstream of the hydroconveyor. In still other versions of the hydroconveyor systems, particular conveyor elements, drive trains, and component configurations are utilized.

Hydroconveyors

The present subject matter provides hydroconveyor systems which are configured for placement above, adjacent to, and ideally at least partially immersed within a flowstream such as in a stream of flowing water, for example a river. The hydroconveyor systems generally comprise a longitudinal frame and one or more tracks or track components that extend along at least a portion of the length of the frame. The tracks typically define a continuous and closed loop or path for a collection of moveable conveyor elements. In one version of the present subject matter, a track is provided which includes an upper portion, a lower portion disposed beneath the upper portion, and two opposite ends between which the upper and lower track portions extend. Typically, the hydroconveyor systems also include a collection of conveyor elements which are moveably engaged with and/or supported within the track. At least a portion and typically all of the conveyor elements include outwardly extending members. The members are configured for contacting and thus engaging the flowstream. Typically, the members are at least partially immersed in the flowstream. In certain versions, the outwardly extending members are in the form of rigid cup-shaped paddles. However, it will be appreciated that the present subject matter includes a wide array of configurations for the members. The hydroconveyors also include one or more rotary powered outputs which can be used to power or drive other components such as for example electrical generators. The hydroconveyors may in certain versions also include one or more (i) systems for magnetically supporting or retaining the conveyor elements with regard to the track(s), and/or (ii) a velocity increasing structure positioned upstream from the frame of the hydroconveyor and typically adjacent to a leading end of the frame. The velocity increasing structure includes converging sidewalls that result in a velocity increase in fluid flowing through the structure. All of these aspects are described in greater detail herein.

Magnetic Levitation

Magnetic levitation is a process of levitating an object by exploiting magnetic fields. More specifically, magnetic levitation overcomes the gravitational force on an object by applying a counteracting magnetic field. Either the magnetic force of repulsion or attraction can be used. In the case of magnetic attraction, the system is known as magnetic suspension. Using magnetic repulsion, the system is referred to as using magnetic levitation.

The present subject matter uses either magnetic suspension and/or magnetic levitation to magnetically support a collection of conveyor elements within a track of a hydroconveyor. The magnetic support means supports and moveably retains a plurality of conveyor elements along one or more tracks or track components. Although various versions of the magnetic support system are contemplated, in many embodiments, rails having a "C" shaped cross section are utilized. Each conveyor element includes a rail engaging member that is sized and configured to be moveably disposed within the hollow interior of the C-shaped rail or rails. The use of magnetic levitation in conveyor systems is generally described in U.S. Pat. Nos. 4,805,761 and 5,641,054.

It will be appreciated that the present subject matter hydroconveyors can utilize other assemblies and/or configurations for movably supporting the plurality of conveyor elements. For example, the use of wheels, rollers, or other rotatable members could be used to support and/or retain the conveyor elements to the track or track portions. In addition, still other assemblies are contemplated such as a chain belt system as known in the art.

Velocity Increasing Structures

The hydroconveyors of the present subject matter may include one or more velocity increasing structures generally disposed upstream of the hydroconveyor. The one or more structures are located upstream from a leading end of the hydroconveyor. The velocity increasing structures generally include an entrance, an exit, and converging sidewalls extending between the entrance and the exit. As flowing liquid such as water enters the structure via the entrance, the progressively constricting flow channel causes the velocity of the liquid to increase. The velocity increasing structures can be incorporated with a hydroconveyor. Alternatively or in addition, a separate stand-alone velocity increasing structure can be utilized in conjunction with a hydroconveyor.

Velocity increasing structures such as velocity increasing waterways are known in the art such as for example as described in U.S. Pat. Nos. 1,296,623; 3,807,890; 7,478,974; and 7,969,034.

Electrical Generators

The present subject matter also provides systems for producing electrical power by use of the hydroconveyors. Generally, and as known in the art, electrical generators include a rotary input and provide electrical power at one or more outputs upon rotation of the input.

Electrical generators and large scale power distribution systems are known in the art and are described for example in U.S. Pat. Nos. 2,939,021; 3,983,430; 4,720,640; 7,405,501; and 8,080,902.

Representative Embodiments

Reference is now made to the accompanying figures which illustrate representative versions of various aspects of the present subject matter.

FIG. 1A is a schematic plan view of a river, a transition region, and a narrowed waterway in accordance with the present subject matter. FIG. 1B is a cross sectional view of the river taken along line 1B-1B in FIG. 1A. FIG. 1C is a cross sectional view of the waterway taken along line 1C-1C in FIG. 1A. Specifically, a river 1 is depicted. The river is generally defined by a pair of opposite sides 6 and 8 and a bottom 10 generally extending between the sides. A narrowed waterway 50 is provided along a portion of the river 1. The waterway 50 extends between a waterway entrance 52 and a waterway exit 54 located downstream from the entrance 52. The waterway is generally defined by a pair of opposite sides 56 and 58 and a bottom 60 generally extending between the sides. As depicted in FIG. 1A, the width of the waterway 50 is less than the width of the river 1. More specifically, the present subject matter involves the waterway 50 to exhibit a flow cross sectional area $A_2$ depicted in FIG. 1C which is less than the flow cross sectional area $A_1$ of the river shown in FIG. 1B taken upstream of the waterway 50. Thus, the smaller flow cross sectional area of $A_2$ of the waterway 50 will typically involve a width dimension that is less than the width associated with the river upstream. However, the present subject matter includes waterways having widths greater than widths of the river taken upstream of the waterway, so long as the flow cross sectional area $A_2$ of the waterway is less than the flow cross sectional area $A_1$ of the river taken upstream of the waterway. Referring further to FIG. 1A, generally a transition region 30 is provided extending between the river 1 and the waterway 50. The transition region 30 generally includes a pair of converging sides 36 and 38. As will be appreciated, the converging sides 36, 38 extend between the sides 6, 8 of the river 1; and the sides 56, 58 of the waterway 50.

As a result of the decrease in flow cross sectional area as water flows from the river 1 to the narrowed waterway 50, i.e. $A_1 > A_2$, the velocity of the water increases. Thus, referring to FIG. 1A, the velocity of water flowing in the river 1 generally depicted as arrow $V_1$ may for example be 4 knots. As a result of the water flowing through the waterway 50 having a smaller flow cross sectional area, the velocity of the water is approximately 50 knots for example, as shown by arrow $V_2$.

The narrowed waterway 50 can be a naturally occurring waterway, an entirely artificial or man-made waterway, or a naturally occurring waterway which is modified. Modification may include increasing or decreasing its width, and/or increasing or decreasing its depth so that its flow cross sectional area, i.e. $A_2$, is such so as to produce a desired velocity in the waterway such as $V_2$. Although not wishing to be limited to any particular velocity, for many applications of the present subject matter hydroconveyors, it is contemplated that a velocity of water flowing through the waterway and around or generally under a hydroconveyor as described in greater detail herein, will be from about 5 knots to about 75 knots, and more typically from about 10 knots to about 60 knots.

It is also contemplated that one or more ancillary waterways or channels can be provided which bypass or circumvent the narrowed waterway 50. An example of such a channel is shown in FIG. 1A as channel 70. Optional upper and lower locks 72 and 74 respectively, can be provided to control access to the channel 70, flow of water within the channel 70, and height or amount of water within the channel 70.

FIG. 2 is a schematic plan view of a hydroconveyor 100 located in the narrowed waterway 50 of FIG. 1A. In this configuration, the present subject matter provides a hydroconveyor 100, described in greater detail herein, having an upstream end 110 and a downstream end 112. The hydroconveyor 100 is positioned generally above but in partial immersion in the water flowing within the waterway 50. The hydroconveyor 100 can include one or more rotary outputs 120 which are selectively engaged with one or more electrical generators 200. It will be appreciated that the present subject matter may include one or more generators 200 along one or both sides or lateral regions of the hydroconveyor 100, denoted as m. And, the subject matter includes one or more generators 200 along the length or portion of the length of the hydroconveyor 100, denoted as n. Thus, a collection of generators 200 or rather a matrix of m×n generators can be powered by the hydroconveyor 100. In this or other configurations, one or more supplemental electrical generators 210 may also be provided. Typically such generators 210 will be located downstream of the hydroconveyor 100. These generators may be used to provide electrical or other power to certain components of the hydroconveyor as described in greater detail herein.

Figure 3:
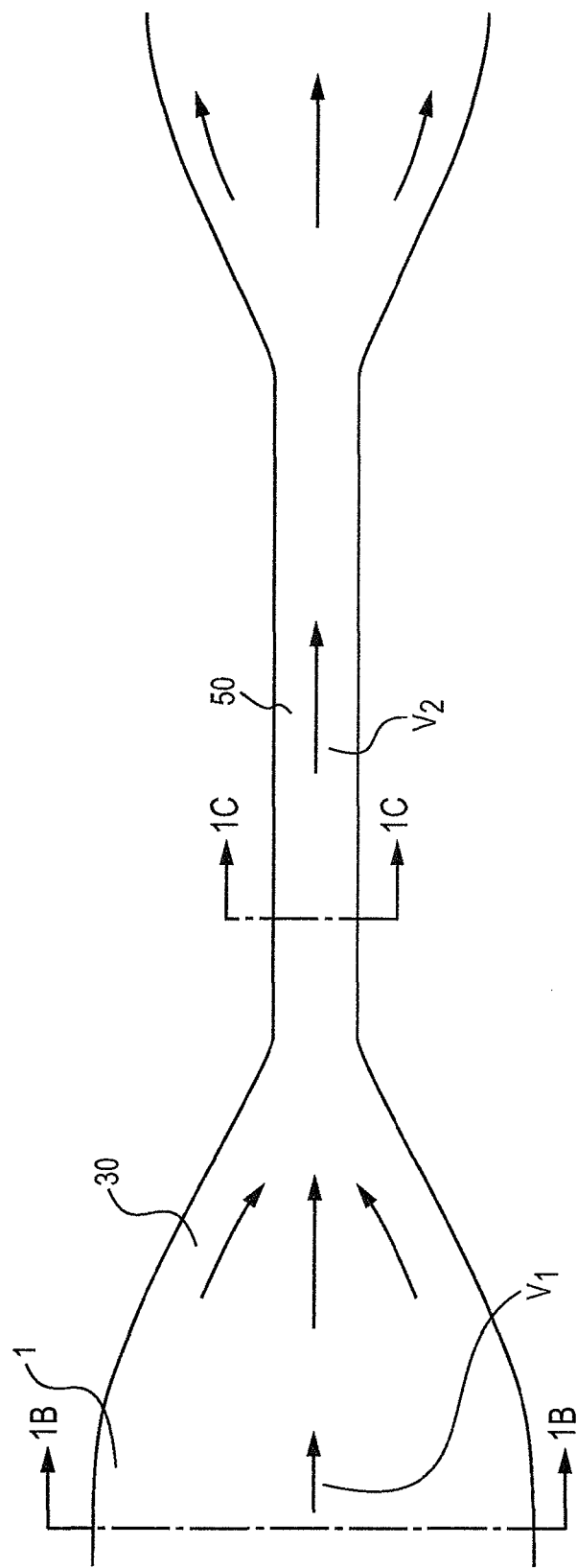
FIG. 3 is a schematic plan view of the waterway of FIG. 1 illustrating the effect of the narrowed waterway upon the velocity of flowing water.

FIG. 3 is a detailed schematic plan view of the waterway 50 of FIG. 1A illustrating the effect of the narrowed waterway upon the velocity of the flowing water. Referring again to FIGS. 1B and 1C. It will be appreciated that the flow cross sectional area $A_2$ of the waterway 50 is typically significantly less than the flow cross sectional area $A_1$ of the river 1. The velocity $V_2$ of water in the narrowed waterway 50 can be calculated by equation (I):

$$A_1 V_1 = A_2 V_2 \qquad (I)$$

Thus, if the flow cross sectional areas of the river 1 and waterway 50 are known, i.e. $A_1$ and $A_2$ respectively, and if the velocity of water in the river 1 taken at the location of $A_1$ is known or measured, then equation (I) enables determination of the velocity $V_2$ of water in the waterway 50 taken at the location of $A_2$. The location of $A_1$ may for example be taken at line 1B-1B shown in FIG. 3. And, the location of $A_2$ may for example be taken at line 1C-1C shown in FIG. 3.

Therefore, depending upon the configuration and parameters of a power generating system as described in greater detail herein, one can readily design a waterway to provide a flow velocity as desired, depending upon the dimensions, size, and/or shape of the flow cross sectional area of the waterway and the dimensions, size, and/or shape of the flow cross sectional area of the river.

FIG. 4A is a schematic side elevational view of a hydroconveyor 100 in accordance with the present subject matter. The hydroconveyor 100 comprises a plurality of rotary supports 130 which are in operable engagement with a conveyor 140 supported and retained in a track or track assembly 150. The conveyor 140 includes a collection of conveyor elements 142 schematically depicted in FIG. 4B. The conveyor elements 142 are engaged or otherwise coupled to one another by one or more conveyor connectors 144. One or more of the conveyor elements 142 may include or be affixed to outwardly extending members 160, as described in greater detail herein. The conveyor 140 is engaged with and supported at least in part by the track 150 extending along the length of the hydroconveyor 100. A variety of assemblies and techniques can be used for movably supporting and/or retaining the conveyor 140 by use of the track 150. In one version, magnetic support provisions are used which are schematically shown in FIG. 4C. In this version, a pair of tracks 150 are provided along opposite lateral sides of the conveyor 140. Magnetic repulsion and/or magnetic suspension techniques are used to maintain a magnetic spacing distance M between the conveyor 140 and the track 150. In the version of the hydroconveyor 100 depicted in FIG. 4A, the track 150 includes an upper track portion 150a extending between opposite ends 110, 112; and a lower track portion 150b disposed under or beneath the upper portion 150a and typically, also extending between the ends 110, 112. The conveyor 140 is movably supported and/or retained by the track 150 such that the conveyor 140 can be linearly displaced along the length or a length portion of the hydroconveyor 100. Preferably, the conveyor 140 and associated track 150 are in the form of a closed, continuous loop. However, it will be understood that the present subject matter includes numerous other track configurations.

As noted, the hydroconveyor 100 also comprises one or more rotary supports 130. The rotary supports 130 are in engagement with the conveyor 140 such that as the conveyor 140 is linearly displaced, such movement is transferred to the rotary supports 130 thus resulting in rotation of the supports 130. One or more geared assemblies or other power transmitting assemblies can be utilized between the conveyor 140 and the rotary supports 130.

Referring further to FIG. 4A, the hydroconveyor 100 is positioned above the waterway 50 and specifically at least partially above a water surface 51 of water flowing in the waterway 50. The height or distance of the hydroconveyor 100 above the water surface 51 is such that at least a portion of the outwardly extending members 160 extending from the conveyor 140 supported by the lower track portion 150b, is immersed in the water. In most embodiments, the hydroconveyor 100 is stationary except for its moving components. The hydroconveyor 100 can be supported along the sides of the waterway 50, by supports extending from the bottom 60 of the waterway 50, and/or by flotation members (not shown) floating within the waterway 50. It is also contemplated that the hydroconveyor 100 can be supported along the river 1 and/or the transition region 30. As will be appreciated, flowing water in the waterway 50 causes linear displacement of the conveyor 140, which in turn results in rotary motion of one or more of the rotary supports 130. The rotary supports 130 can be in engagement with the previously noted rotary outputs 120 for powering electrical generators or other components.

Figure 5:
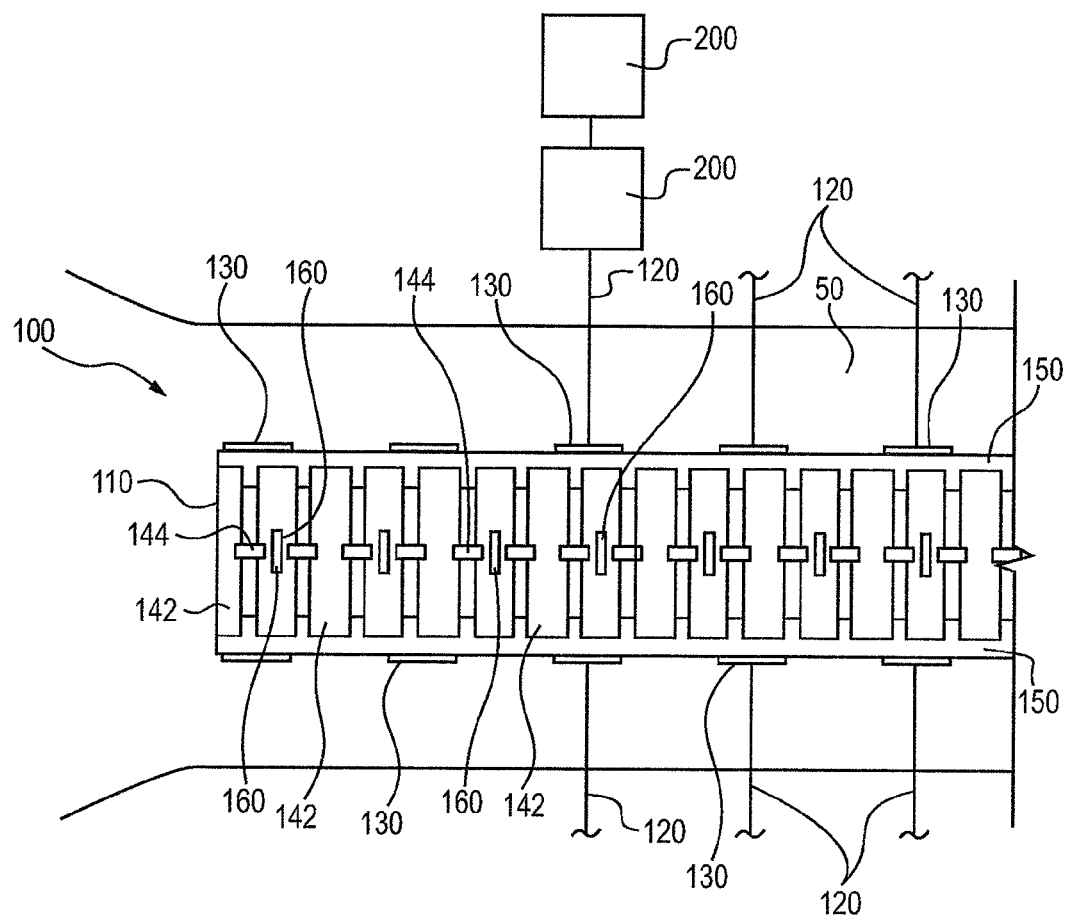
FIG. 5 is a schematic plan view of a portion of the hydroconveyor depicted in FIG. 4A.

FIG. 5 is a schematic partial plan view of the hydroconveyor 100 depicted in FIG. 4. FIG. 5 further illustrates powering of one or more generators 200 by rotary outputs 120 extending between the hydroconveyor 100 and the generators 200. FIG. 5 also depicts a possible configuration of the collection of outwardly extending members 160 relative to the conveyor elements 142. That is, the members 160 could be separated from one another by one, two or more elements 142. The present subject matter also includes a configuration in which each conveyor element 142 includes one or more outwardly extending members 160.

Figure 6:
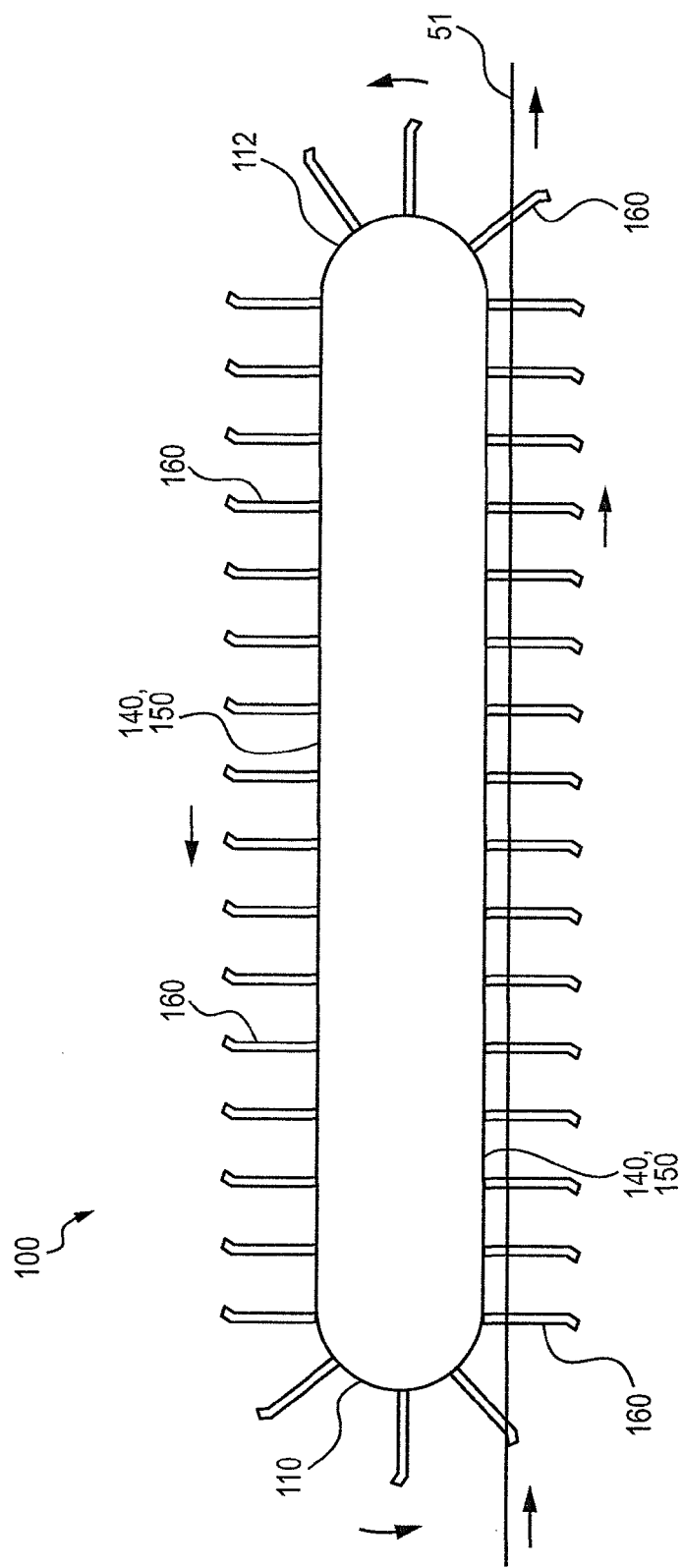
FIG. 6 is a schematic side elevational view of another hydroconveyor in accordance with the present subject matter.

FIG. 6 is a schematic side elevational view of another hydroconveyor 100 in accordance with the present subject matter. Specifically, FIG. 6 illustrates the hydroconveyor 100 having a longitudinal frame including a first end 110 and a second opposite end 112. The hydroconveyor 100 also has a track 150 extending between the ends 110, 112. The hydroconveyor 100 also includes a plurality of conveyor elements which form a conveyor 140 which is movably disposed and retained in the track 150. The conveyor 140 or more specifically, at least a portion of the conveyor elements include outwardly extending members 160. The hydroconveyor 100 is positioned relative to a flowstream such as flowing water such that at least a portion of the outwardly extending members 160 are immersed or in contact with the flowstream.

Figure 7A:
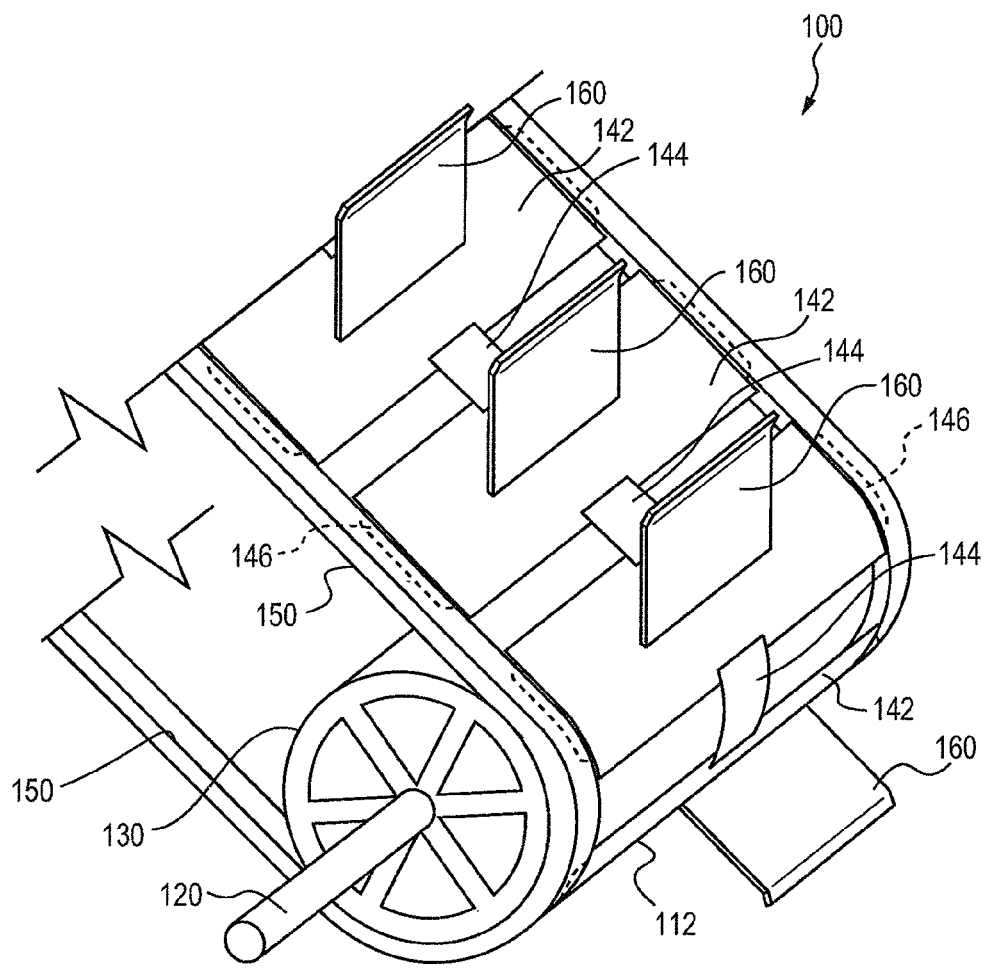
FIG. 7A is a detailed schematic partial perspective view of an end region of the hydroconveyor depicted in FIG. 6.
Figure 7B:
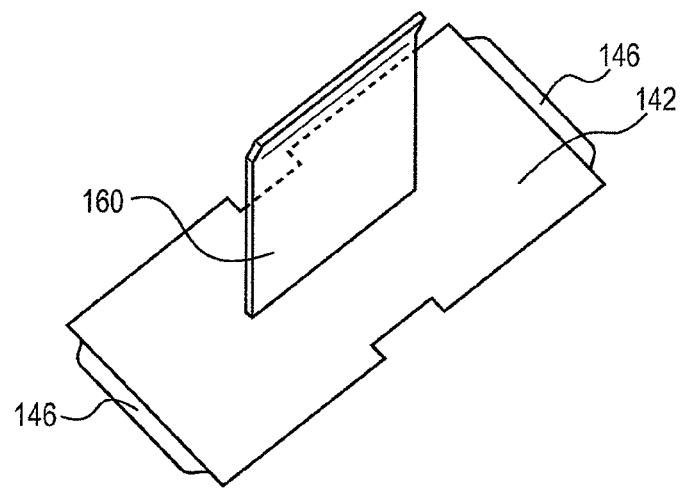
FIG. 7B is a schematic perspective view of a typical conveyor element used in a hydroconveyor of the present subject matter.

FIG. 7A is a detailed schematic partial perspective view of an end region 112 of the hydroconveyor 100 depicted in FIG. 6. FIG. 7B is a schematic perspective view of a single conveyor element used in the hydroconveyor 100. Specifically, FIG. 7A illustrates in greater detail a typical configuration of conveyor elements 142, conveyor connectors 144, and outwardly extending members 160, which form the conveyor 140. As shown in FIGS. 7A and 7B, each conveyor element 142 can include laterally extending engagement portions 146. The engagement portions 146 are sized and shaped to be movably received within interior channels defined along the track 150 and as described in greater detail herein.

Figure 8:
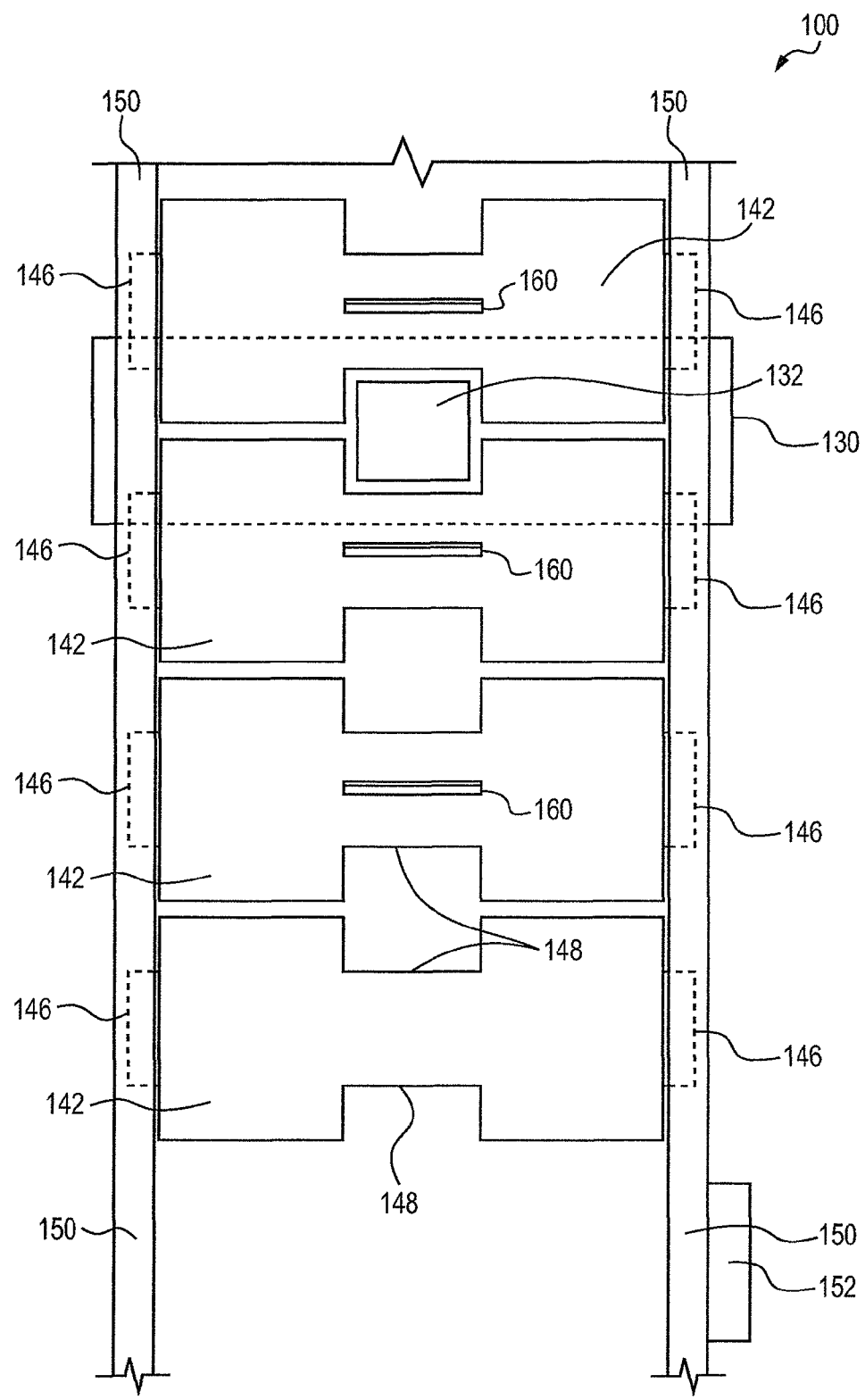
FIG. 8 is a partial schematic top view of several conveyor elements used in a hydroconveyor of the present subject matter.

FIG. 8 is a partial schematic top view of several conveyor elements used in a hydroconveyor 100 of the present subject matter. In this version, one or more gear members 132 are provided in conjunction with the rotary supports 130. The gear members 132 extend radially outward from the rotary supports 130. Gear receiving provisions 148 can be provided by adjacent edge regions of conveyor elements 142. The gear receiving provisions 148 are sized and shaped to engage the corresponding gear members 132 associated with the rotary supports 130. As shown in FIG. 8, a plurality of conveyor elements 142 are supported and retained by a pair of tracks 150. The previously noted engagement portions 146 can be used to support and retain the conveyor elements 142 in the tracks 150. A collection of rail supports or support members 152 can be used to maintain the tracks 150 in a desired position or relationship.

Figure 9:
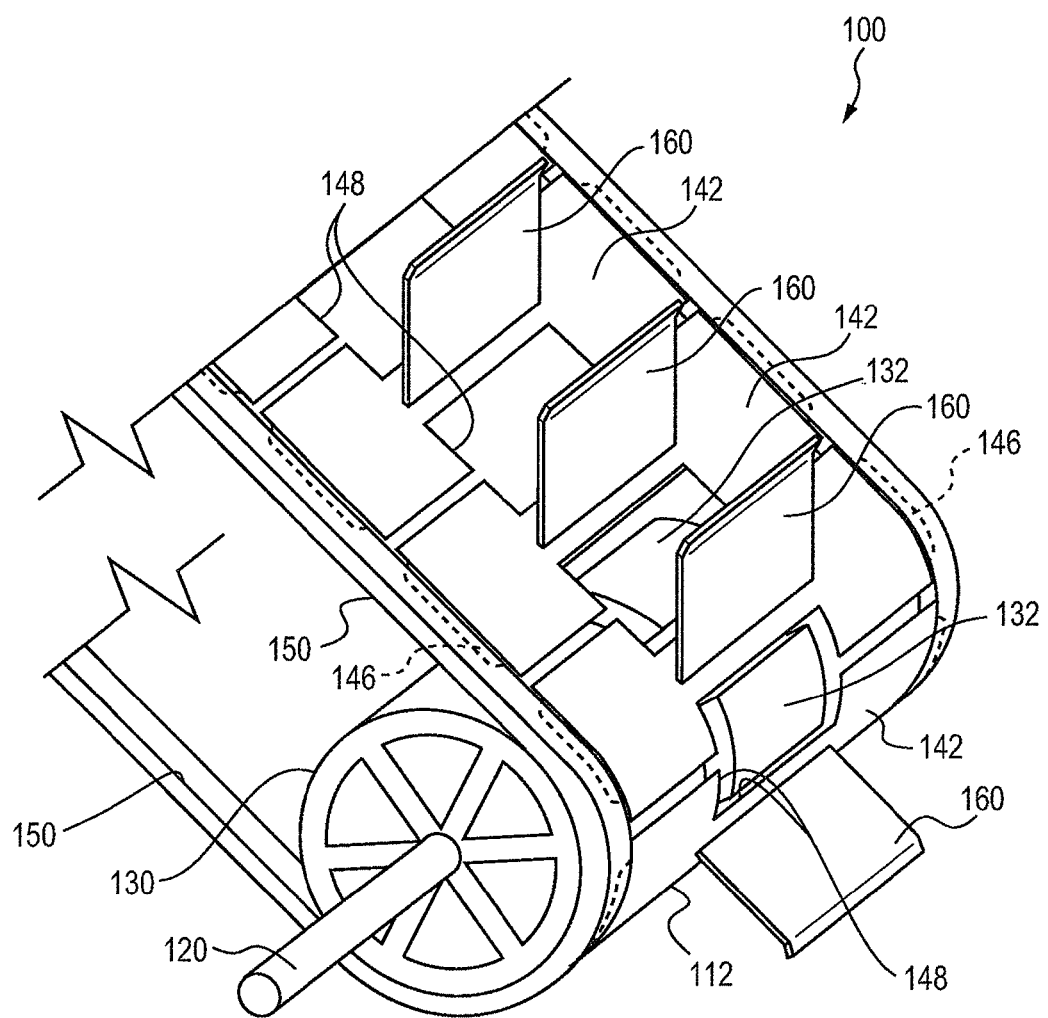
FIG. 9 is a detailed schematic partial perspective view of an end region of the hydroconveyor shown in FIG. 8 in accordance with the present subject matter.

FIG. 9 is a detailed schematic partial perspective view of the end region 112 of the hydroconveyor 100 depicted in FIG. 8 in accordance with the present subject matter. In this version, the outward and radially projecting gear members 132 are received and engaged within the gear receiving provisions 148 formed by adjacent conveyor elements 142. In this manner, linear movement of the conveyor elements 142 along the track 150, is transferred to rotary movement of the rotary support 130. Rotary displacement of the rotary support 130 is transmitted to the rotary output 120.

Figure 10A:
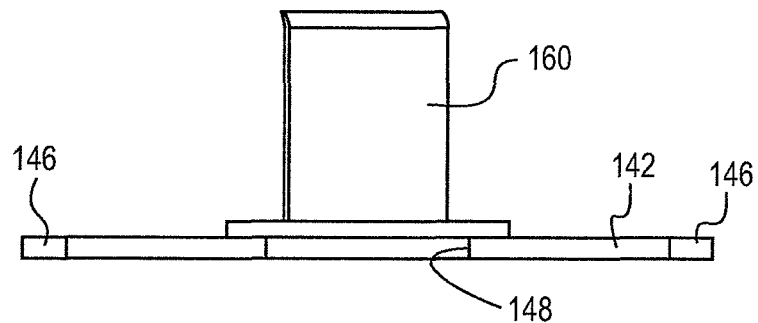
FIGS. 10A and 10B are schematic elevational views of conveyor elements in two different positions in a hydroconveyor according to the present subject matter.
Figure 10B:
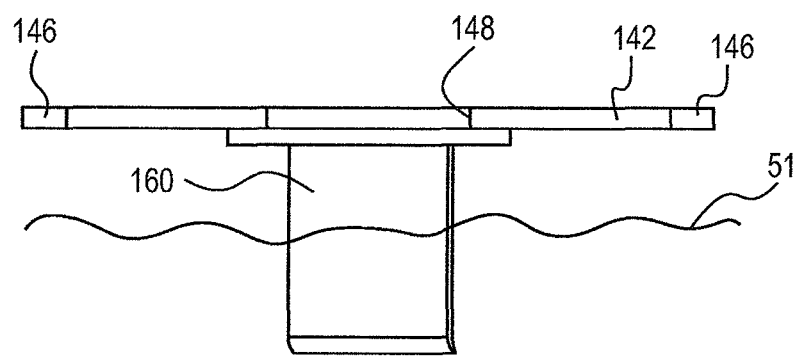

FIGS. 10A and 10B are schematic elevational views of conveyor elements 142 in two different positions in a hydroconveyor according to the present subject matter. Specifically, FIG. 10A depicts a conveyor element 142 disposed in an upper track portion 150a shown in FIG. 4A for example. And, FIG. 10B depicts a conveyor element 142 disposed in a lower track portion 150b shown in FIG. 4B for example. Each conveyor element includes a pair of laterally extending engagement portions 146 extending from the conveyor element 142. Although a wide array of outwardly extending members 160 can be utilized, the version having a curved distal tip as depicted in FIG. 6 is illustrated. Also shown in FIGS. 10A and 10B, are the gear receiving provisions 148.

Figure 11:
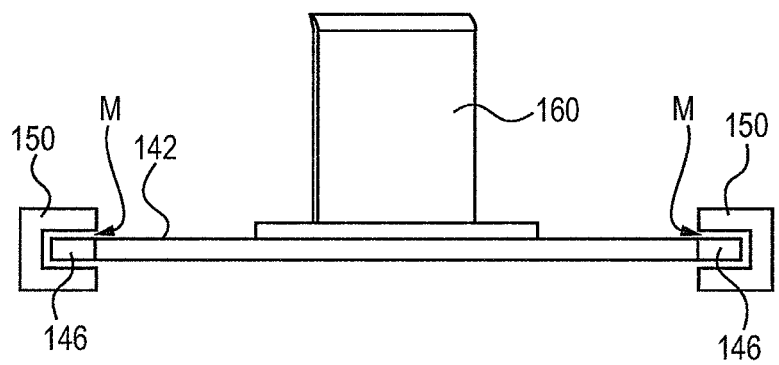
FIG. 11 is a schematic front elevational view of a conveyor element magnetically supported in a track in accordance with the present subject matter.

FIG. 11 is a schematic front elevational view of a conveyor element 142 magnetically supported in a track 150 in accordance with the present subject matter. Specifically, the conveyor element 142 is supported and retained within a pair of tracks 150. Each engagement portion 146 is disposed within an interior region of a track member 150. If magnetic support provisions are utilized to support and retain the conveyor element 142 relative to the track 150, a magnetic spacing distance M is generally maintained between the conveyor element 142 and interior facing portions of the track 150. As will be appreciated, the use of magnetic support provisions significantly reduce friction otherwise occurring between conveyor elements 142 and the rails 150. Decreasing friction otherwise associated with linear displacement of the conveyor 140 significantly increases operating efficiency of the hydroconveyor.

Figure 12A:
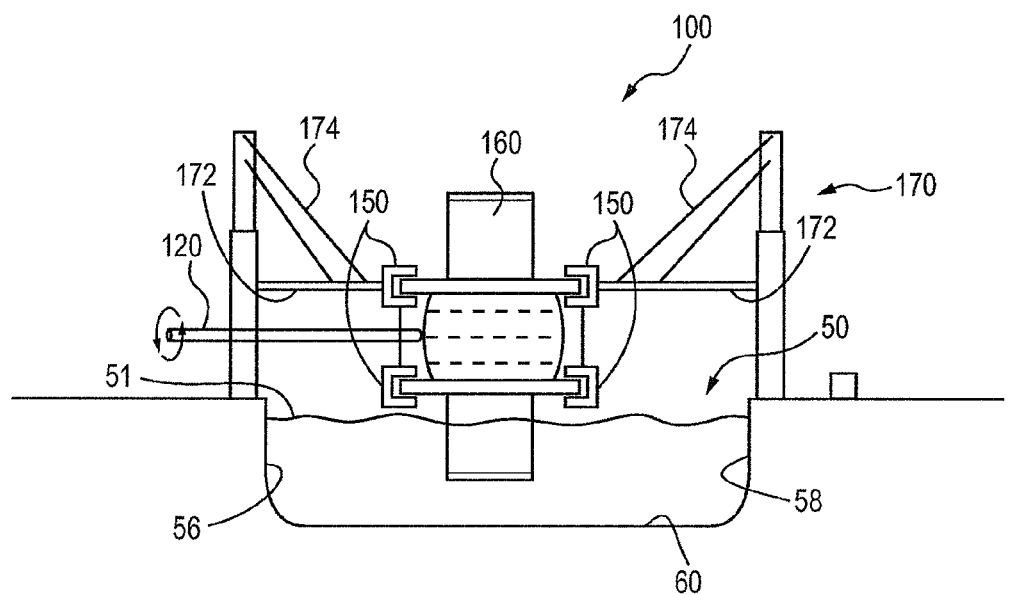
FIG. 12A is a schematic end view of a hydroconveyor positioned within a waterway in accordance with the present subject matter.

FIG. 12A is a schematic end view of a hydroconveyor 100 positioned within a waterway 50 in accordance with the present subject matter. Specifically, the hydroconveyor 100 is positioned above the surface 51 of water in the waterway 50 such that at least distal end portions of the members 160 are immersed within the water. The hydroconveyor 100 can be supported along the sides or lateral regions of the waterway 50 by a support carriage 170 for example. The support carriage 170 can include laterally extending support members 172 and/or tensioned support members 174 which can be in the form of cables for example. Upon flow of water in the waterway 50, rotary power is produced or available at rotary output(s) 120.

Figure 12B:
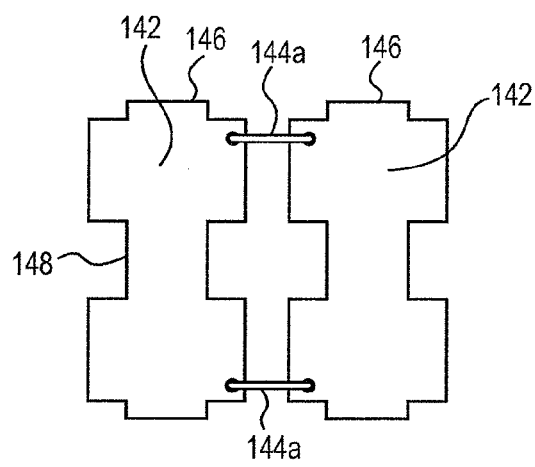
FIGS. 12B-12C are schematic plan views of pairs of conveyor elements engaged to one another in accordance with the present subject matter.
Figure 12C:
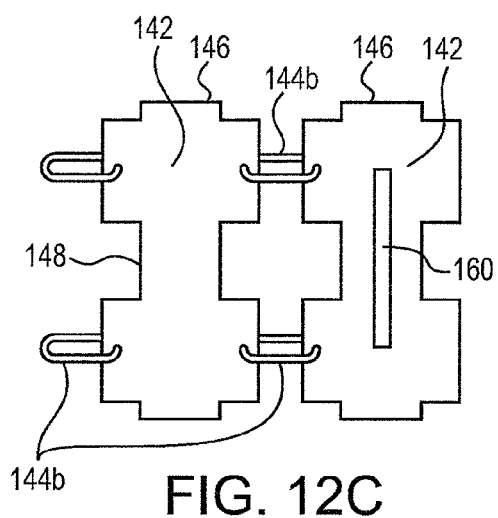

FIGS. 12B-12C are schematic plan views of pairs of conveyor elements 142 engaged to one another in accordance with the present subject matter. Specifically, these figures depict particular versions of conveyor connectors 144. FIG. 12B depicts two conveyor elements 142 engaged to one another by a pair of flexible connectors 144a. FIG. 12C depicts two conveyor elements 142 engaged to one another by a pair of chain links 144b or other comparable components. The conveyor elements 142 include the previously described engagement portions 146 and gear receiving provisions 148.

Figure 13:
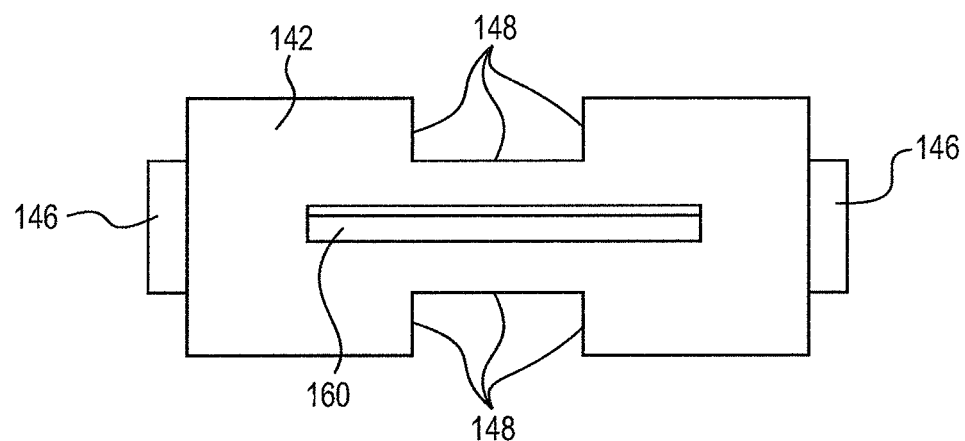
FIG. 13 is a schematic plan view of another conveyor element in accordance with the present subject matter.
Figure 14:
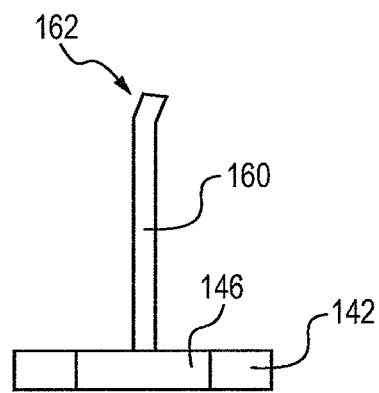
FIG. 14 is a schematic end view of the conveyor element depicted in FIG. 13.

FIG. 13 is a schematic plan view of another conveyor element 142 in accordance with the present subject matter. FIG. 14 is a schematic end view of the conveyor element depicted in FIG. 13. This version includes an outwardly extending member 160 having a curved distal end 162. It will be understood that the present matter includes a wide array of configurations for the conveyor elements 142 and the members 160, and in no way is limited to the particular embodiments depicted and/or described herein. The conveyor element 142 includes previously described engagement portions 146 and gear receiving provisions 148.

Figure 15:
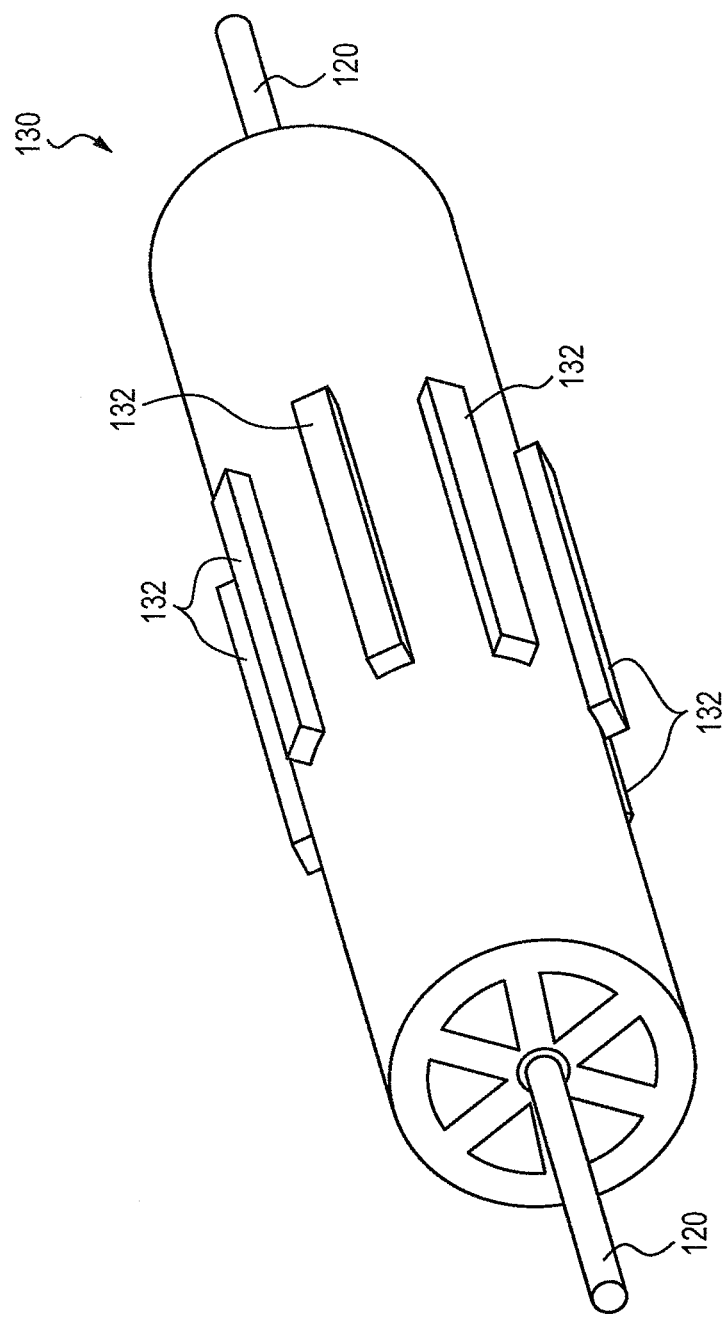
FIG. 15 is a detailed schematic partial perspective view of a rotary support used in a hydroconveyor in accordance with the present subject matter.
Figure 16:
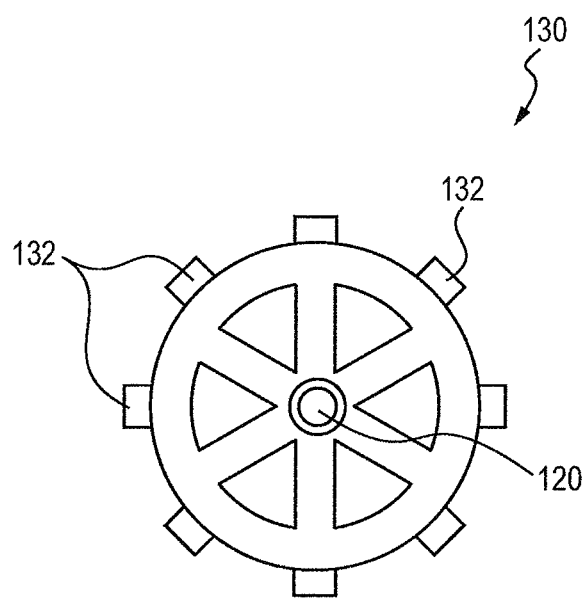
FIG. 16 is a schematic side view of the rotary support depicted in FIG. 15 according to the present subject matter.

FIG. 15 is a detailed schematic perspective view of a rotary support 130 used in a hydroconveyor in accordance with the present subject matter. FIG. 16 is a schematic side view of the rotary support 130 depicted in FIG. 15. The rotary support 130 includes a collection of outwardly extending radial projections or gear members 132 that engage the conveyor 140 of the hydroconveyors described herein. Any number such as from 2 to 40 or more gear members 132 can be used.

Figure 17:
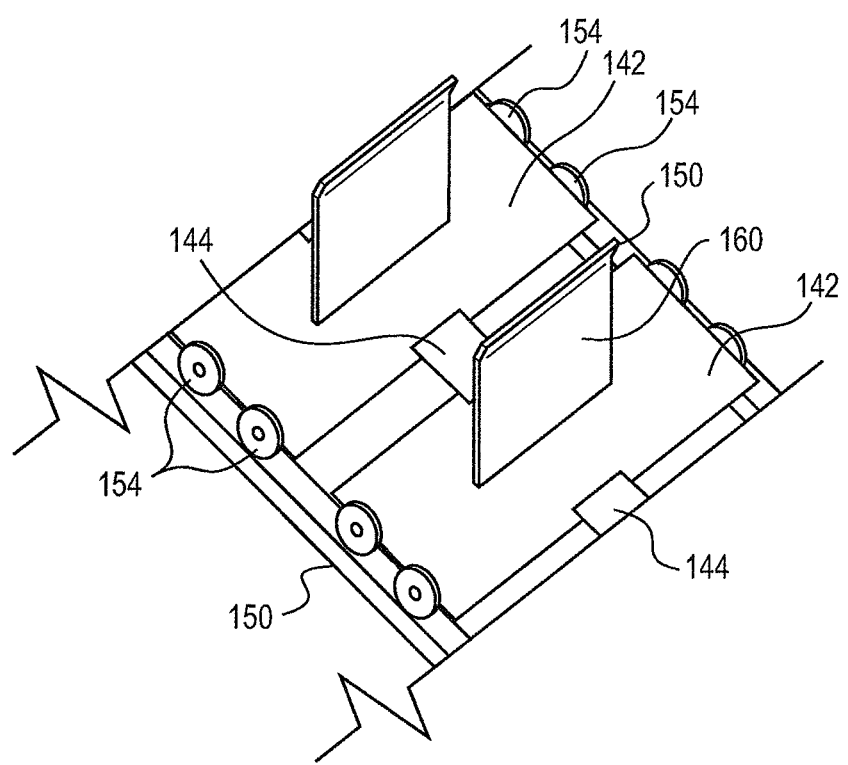
FIG. 17 is a schematic perspective view of another conveyor element supported in a track in a hydroconveyor according to the present subject matter.

FIG. 17 is a schematic partial perspective view of a collection of conveyor elements 142 used in a hydroconveyor according to the present subject matter. In this version, the plurality of conveyor elements 142 are engaged to each other by flexible conveyor connectors 144. And, each conveyor element 142 includes one or more rollers 154 which are configured to roll or slide within channels defined along the tracks 150.

It is also contemplated that the present subject matter can be applied to flowstreams of other materials besides water. For example, materials having densities different than that of water can be utilized. A flowing material having a greater density, i.e. mass, than that of water will exhibit greater kinetic energy than a comparable amount of water flowing at the same velocity.

Additional Aspects

The present subject matter also includes configurations in which velocity increases resulting from elevational changes can be imparted to the flowing material such as water prior to and/or during directing the flowing material to a hydroconveyor, a velocity increasing structure, and/or an electrical generator. For example, by selectively incorporating an elevational change or a downward descent in a flowpath, an increase in velocity can be imparted to a fluid flowing in such flowpath. Thus, the present subject matter includes incorporating an elevational reduction, i.e. a decrease in the height, in a flowpath. The elevational reduction can be defined in terms of its downward slope or grade according to equation (II):

$$\frac{\text{Change in Elevation, } \Delta Y}{\text{Linear Distance, } \Delta X} \qquad \text{(II)}$$

As will be appreciated, slope is also referred to as gradient, incline (if positive), and decline (if negative).

The present subject matter includes systems in which a flowstream is directed along a decline or in a direction resulting from a decrease in elevation. Also included are systems utilizing velocity increasing structures positioned upstream of the declining flowpath, positioned downstream of the declining flowpath, and positioned at any location along the length of the declining flowpath.

Figure 18:
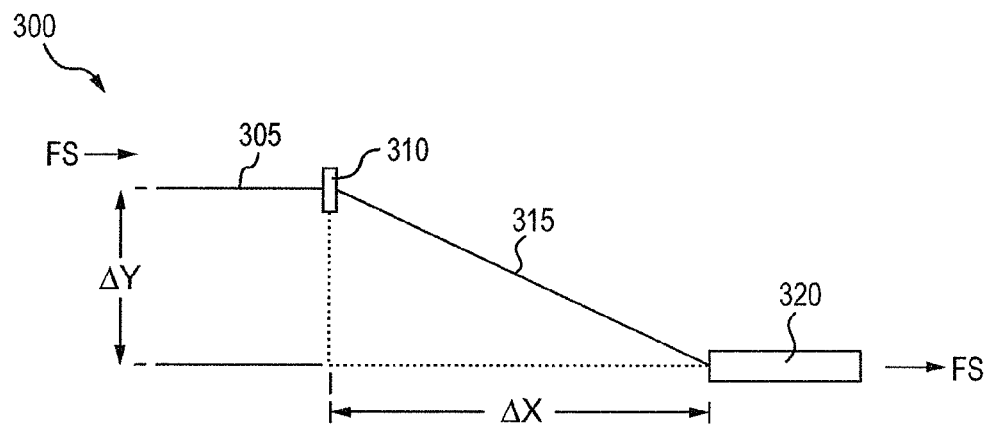
FIG. 18 is a schematic view of a system having a declining flowpath in accordance with the present subject matter.
Figure 19:
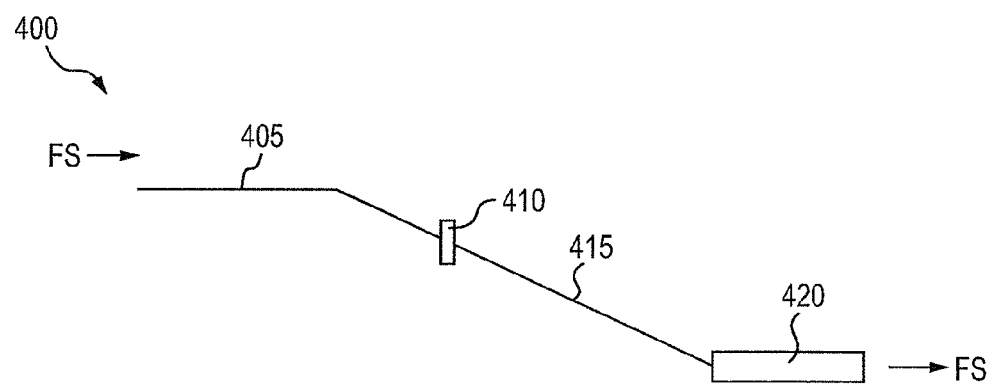
FIG. 19 is a schematic view of another system having a declining flowpath in accordance with the present subject matter.
Figure 20:
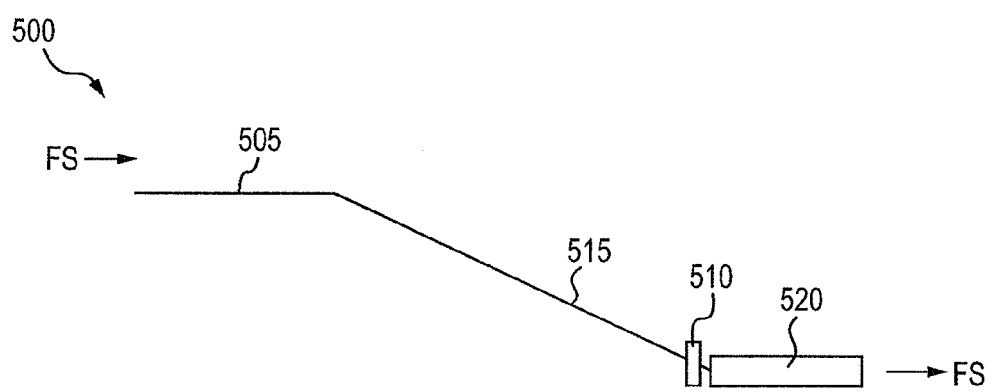
FIG. 20 is a schematic view of yet another system having a declining flowpath in accordance with the present subject matter.

FIGS. 18-20 schematically depict several systems utilizing a declining flowpath. For example, FIG. 18 depicts a system 300 comprising a first flowpath portion 305 in which the direction of the flowstream is shown as "FS." The system includes a declining flowpath 315 downstream of the first flowpath portion 305. The system also includes a hydroconveyor 320 as described herein downstream of the declining flowpath 315. The system 300 additionally comprises a velocity increasing structure 310 disposed at a location upstream of the declining flowpath 315. The grade of the declining flowpath 315 is measured by dividing the change in height $\Delta Y$ by the linear distance $\Delta X$ of the flowpath 315. Referring further to FIG. 18, if for example the change in elevation $\Delta Y$ of the declining flowpath 315 was 15 meters and the linear distance $\Delta X$ of the declining flowpath was 300 meters, the grade of the declining flowpath would be 0.05 (or 5%). The present subject matter includes a wide range of grades for declining flowpaths such as from about 0.001 to about 10, more particularly from 0.01 to 1, and more particularly from 0.02 to 0.5. FIG. 19 depicts a similar system 400 comprising a first flowpath portion 405, a declining flowpath 415, a hydroconveyor 420, and a velocity increasing structure 410 positioned at a location along the declining flowpath 415. And, FIG. 20 depicts a similar system 500 comprising a first flowpath portion 505, a declining flowpath 515, a hydroconveyor 520, and a velocity increasing structure 510 positioned downstream of the declining flowpath. In all of these systems, it is generally beneficial to position the hydroconveyor downstream of both the declining flowpath and the velocity increasing structure. However, it will be appreciated that the present subject matter includes a variety of different configurations. Moreover, the present subject matter includes the use of a sequential arrangement of multiple declining flowpaths with or without velocity increasing structures.

EXAMPLES

In accordance with the present subject matter, a large scale electrical generating system could be provided as follows.

A relatively wide waterway such as a river, having a width of about 1500 feet and a depth of about 40 feet, with a relatively low water velocity of 4 knots is modified to include a narrowed region to thereby result in a water velocity of about 53 knots as measured in the narrowed region. Representative dimensions for the narrowed region are approximately 300 feet wide by approximately 15 feet deep.

One or more of the hydroconveyors as described herein are assembled over or at least partially within the narrowed region. The outwardly extending members of the conveyor elements of the hydroconveyor(s) are in contact with the high velocity water. As a result of immersion of the conveyor elements in the flowing water, the conveyor elements are displaced along their corresponding track(s). Movement of the conveyor results in rotation of one or more rotary outputs of the hydroconveyor.

Electrical generators are engaged with the powered rotary outputs of the hydroconveyor. Thus, as a result of flow of water through the narrowed region of the waterway, the hydroconveyor is operated to provide powered rotation of one or more outputs which are used to drive electrical generators and thereby produce electrical power.

Many other benefits will no doubt become apparent from future application and development of this technology.

All patents, applications, and articles noted herein are hereby incorporated by reference in their entirety.

As described hereinabove, the present subject matter overcomes many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A hydroconveyor system adapted for placement in a flowstream, the hydroconveyor system comprising:
   a longitudinal frame including a first distal end and a second distal end;
   a track extending along at least a portion of the length of the frame between the first end and the second end of the frame, the track defining a continuous and closed loop;
   a plurality of conveyor elements movably disposed and retained in the track, wherein at least a portion of the plurality of conveyor elements include outwardly extending members for engaging the flowstream; and
   means for magnetically supporting the plurality of conveyor elements with regard to the track.

2. The hydroconveyor system of claim 1 wherein the outwardly extending members for engaging the flowstream are in the form of rigid cup-shaped paddles.

3. The hydroconveyor system of claim 1 wherein the track extends between the first end and the second end of the frame.

4. The hydroconveyor system of claim 1 wherein the track includes a first track portion extending along a region of the frame and a second track portion also extending along the region of the frame and oriented parallel to the first track portion, the second track portion disposed beneath the first track portion.

5. The hydroconveyor system of claim 1 further comprising:
   a velocity increasing structure disposed upstream from the frame and proximate one of the frame ends, the structure including an entrance, an exit, and converging sidewalls extending between the entrance and the exit which result in a velocity increase of the flowstream within the structure.

6. The hydroconveyor system of claim 1 further comprising:
   at least one rotatable member rotatably supported by the frame and in engagement with the plurality of conveyor elements such that as the conveyor elements move linearly along the track, the at least one rotatable member is rotated.

7. The hydroconveyor system of claim 6 further comprising:
   at least one electrical generator engaged with the at least one rotatable member such that upon rotation of the rotatable member, the electrical generator provides an output of electrical power.

8. The hydroconveyor system of claim 1 wherein the means for magnetically supporting the conveyor elements utilizes magnetic suspension between the conveyor elements and the track.

9. The hydroconveyor system of claim 1 wherein the means for magnetically supporting the conveyor elements utilizes magnetic repulsion between the conveyor elements and the track.

* * * * *